United States Patent [19]
Speiser et al.

[11] 3,952,186
[45] Apr. 20, 1976

[54] APPARATUS FOR THE GENERATION OF A TWO-DIMENSIONAL DISCRETE FOURIER TRANSFORM

[75] Inventors: Jeffrey M. Speiser; Harper John Whitehouse, both of San Diego, Calif.

[73] Assignee: The United States of America as represented by the Secretary of the Navy, Washington, D.C.

[22] Filed: Feb. 10, 1975

[21] Appl. No.: 548,300

[52] U.S. Cl. ............................................... 235/156
[51] Int. Cl.² ......................................... G06F 15/34
[58] Field of Search .................. 235/156; 324/77 B; 179/15 BC

[56] References Cited
UNITED STATES PATENTS
3,686,490  8/1972  Goldstone ........................... 235/156
3,775,602  11/1973  Alexandridis et al. .............. 235/156

OTHER PUBLICATIONS
P. E. Anuta, "Spatial Registration of Multispectral and Multitemporal Digital Imagery Using FFT Techniques," IEEE Trans. on Geoscience Electronics, Vol. GE-8, No. 4 Oct. 1970, pp. 353-368.

Primary Examiner—David H. Malzahn
Attorney, Agent, or Firm—Richard S. Sciascia; Ervin F. Johnston; John Stan

[57] ABSTRACT

An apparatus for the generation of a two-dimensional discrete Fourier transform of an input signal developed from data within a data block, or field, having a size of $N_1$ by $N_2$ data points, $N_1$ and $N_2$ being relatively prime with respect to each other, the transforms being in a form suitable for subsequent electronic processing. The apparatus comprises an input scan apparatus connectable to the $N_1$ by $N_2$ two-dimensional data field comprising the input signal, such as a television viewing field. The apparatus receives and scans in proper order, or sequence, the $N_1$ by $N_2$ input data so that the subsequently generated one-dimensional Fourier transform of the length $N_1 N_2$ serial data string is identical to an $N_1$ by $N_2$ two-dimensional discrete Fourier transform of the $N_1$ by $N_2$ input data samples. A serial-access one-dimensional discrete Fourier transform (DFT) device, connected to the input scan generator, generates a one-dimensional discrete Fourier transform of the length $N_1 N_2$ serial data string.

12 Claims, 4 Drawing Figures

TWO-DIMENSIONAL DISCRETE FOURIER TRANSFORM (DFT) APPARATUS.

INPUT, OR OUTPUT, SCAN GENERATOR FOR USE WITH TWO-DIMENSIONAL (DFT) APPARATUS.

REDUCED REDUNDANCY IMAGE TRANSMISSION SYSTEM USING TWO-DIMENSIONAL DISCRETE FOURIER TRANSFORM APPARATUS.

RECURSIVE FILTER FOR DISCRETE CHIRP GENERATION.

APPARATUS FOR THE GENERATION OF A TWO-DIMENSIONAL DISCRETE FOURIER TRANSFORM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Many problems of image processing and other processing of two-dimensional data require the rapid generation of two-dimensional Fourier transforms in a form suitable for subsequent electronic processing or utilization. This invention relates to apparatus which performs realtime image processing and which may be implemented with small, light-weight, special-purpose hardware.

In the prior art, two-dimensional Fourier transforms are ordinarily generated either optically or through the use of a digital computer. Both of these methods suffer from severe limitations in many signal-processing applications. A general-purpose digital computer large enough to perform two-dimensional Fourier transforms in real time for may signal-processing applications is large, heavy, expensive, and consumes a large amount of electrical power. Coherent optical two-dimensional Fourier transform implementations are limited by their input-output media and interface poorly with electronic systems.

A third method for performing two-dimensional Fourier transforms is to perform a row by row one-dimensional transform with serial-access hardware, such as that described by Whitehouse, H. J., J. M. Speiser, and R. W. Means, in the article entitled *High Speed Serial Access Linear Transform Implementations*, presented at the All Applications Digital Computer (AADC) Symposium, Orlando, Florida, 23-25, Jan. 1973. The one-dimensional row transforms are stored, and a column by column one-dimensional transform is performed. This method, however, requires an auxiliary memory to store the one-dimensional transforms of the entire data field. The auxiliary memory tends to be expensive in terms of cost, weight, and power consumption. It is therefore desirable to seek a method of using the one-dimensional serial-access Fourier transform device with a minimum of auxiliary hardware to perform two-dimensional Fourier transforms. The apparatus of this invention accomplishes this task with a minimal amount of hardware.

SUMMARY OF THE INVENTION

This invention relates to an apparatus for the generation of a two-dimensional discrete Fourier transform of an input signal developed from data within a data block, or field, having a size of $N_1$ by $N_2$ data points, $N_1$ and $N_2$ being relatively prime with respect to each other, the transforms being in a form suitable for subsequent electronic processing. The apparatus includes an input scan apparatus connectable to the $N_1$ by $N_2$ two-dimensional data field comprising the input signal, such as a television viewing field. The apparatus receives and scans in proper order, or sequence, the $N_1$ by $N_2$ input data so that the subsequently generated one-dimensional Fourier transform of the length $N_1 N_2$ serial data string is identical to an $N_1$ by $N_2$ two-dimensional discrete Fourier transform of the $N_1$ and $N_2$ input data samples. A serialaccess one-dimensional discrete Fourier transform (DFT) device, connected to the input scan generator, generates a one-dimensional discrete Fourier transform of the length $N_1 N_2$ serial data string. The output data format is the one-dimensional data stream, however that one-dimensional data stream represents the two-dimensional discrete Fourier transform.

The input scan apparatus may comprise an imaging device which receives and stores the data from the two-dimensional data field, and an input scan generator, which scans in proper order the stored data in the imaging device, the stored data being scanned at discrete data points having coordinate values $j_1$ and $j_2$, the coordinate system generally being orthogonal.

STATEMENT OF THE OBJECTS OF THE INVENTION

An object of the present invention is to provide apparatus which indirectly calculates a two-dimensional Fourier transform using one-dimensional Fourier transform apparatus which is the equivalent of two-dimensional transform apparatus.

Another object of the invention is to provide apparatus which scans the data points in a rectangular data block in a specific order, and then generates a two-dimensional discrete Fourier transform of the data.

A further object of the invention is to provide apparatus wherein the scanning of the two-dimensional discrete Fourier transform is such that the terms of the transform are identical to a one-dimensional Fourier transform of the data.

Other objects, advantages and novel features of the invention will become apparent from the following detailed description of the invention; when considered in conjunction with the accompanying drawings, wherein:

DESCRIPTION OF THE PREFERRED EMBODIMENTS

Before discussing specific embodiments of the invention, an overall, qualitative, description of the invention should prove useful.

The transform devices used in this invention are serial-access devices, that is, they accept one data point at a time. Each time a point is scanned, a signal is transmitted to the serial-access transform device. As the scanning is continued from point to point, a sampled analog signal is generated, representing successive values of amplitudes of the brightness levels of the scanned points. A discrete Fourier transform is taken of that sequence of points. This sequence is regarded as a one-dimensional data string. As the sequence is generated in time, it is a onedimensional sequence which is a function of time.

As an example, if the first scanned point has a brightness level which is equal to 0.8, the second 0.7 and the third 0.1, this represents a sequence of numbers in time. This sequence of values is regarded as a time function. A one-dimensional Fourier transform is taken of this sequence of values, of this time function. This is the operation a serial-access one-dimensional discrete Fourier transform device used in this invention performs.

Spatial functions are involved. It is assumed that any field being sampled does not change in space during a scan time, that is, during the whole scan time the signal of concern is a function of space only. It may be a slowly changing function of time, but the signal is assumed to be unchanging in time during the period of one complete scan, that is, the scan is completed fast enough so that essentially the various brightness levels have not changed.

Each point in the $N_1$ by $N_2$ rectangular array represnts represents brightness level, if the data field involves an optical image. The brightness levels may be discrete levels, but generally would be analog levels, since the transform device is generally analog. This would be true particularly if the transform device is a surface-wave device or a charge-coupled device.

In principle, one could build a two-dimensional version of the chirp-z transform device, used in apparatus similar to that used in this invention. But it would require two-dimensional correlations, which requires shifting a data field both horizontally and vertically. This is difficult if not impossible to do. The apparatus of this invention has the same effect: it generates two-dimensional transform components, but it does it by using one-dimensional transform components; it scans, it transforms and the output of the one-dimensional transform is interpreted as two-dimensional transform points.

In other applications, the data field may be a rectangular array of hydrophones, in which case the data field represents a set of voltages, sampled at some particular time.

Figure 1:
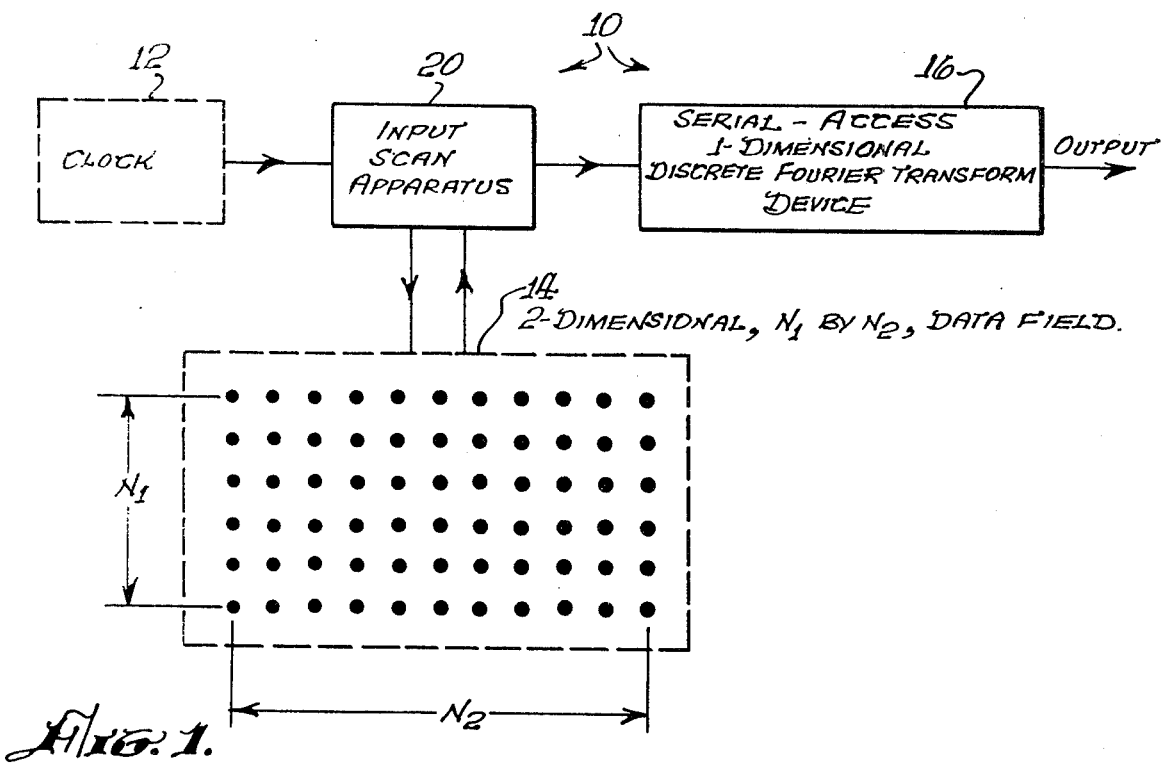
FIG. 1 is a block diagram of a simplified two-dimensional discrete Fourier transform apparatus.

Referring now to FIG. 1, this figure shows an apparatus 10, which would generally be connected to a timing source, or clock 12, for the generation of a two-dimensional discrete Fourier transform of an input signal developed from data within a data block, or field 14, having a size of $N_1$ by $N_2$, $N_1$ and $N_2$ being relatively prime with respect to each other, the transforms being in a form suitable for subsequent electronic processing.

The apparatus 10 comprises an input scan apparatus 20 connectable to the $N_1$ by $N_2$ two-dimensional data field, such as a television viewing field, from which the input signal is developed. The scan apparatus receives and scans in proper order, or sequence, the $N_1$ by $N_2$ input data so that the subsequently generated one-dimensional Fourier transform of the length $N_1 N_2$ serial data string is identical to an $N_1$ by $N_2$ two-dimensional discrete Fourier transform of the $N_1$ by $N_2$ input data samples.

The simplified apparatus 10 also includes a serial-access one-dimensional discrete Fourier transform (DFT) device 16, connected to the input scan apparatus 20, for generating a onedimensional discrete Fourier transform of the length $N_1 N_2$ serial data string.

Figure 2:
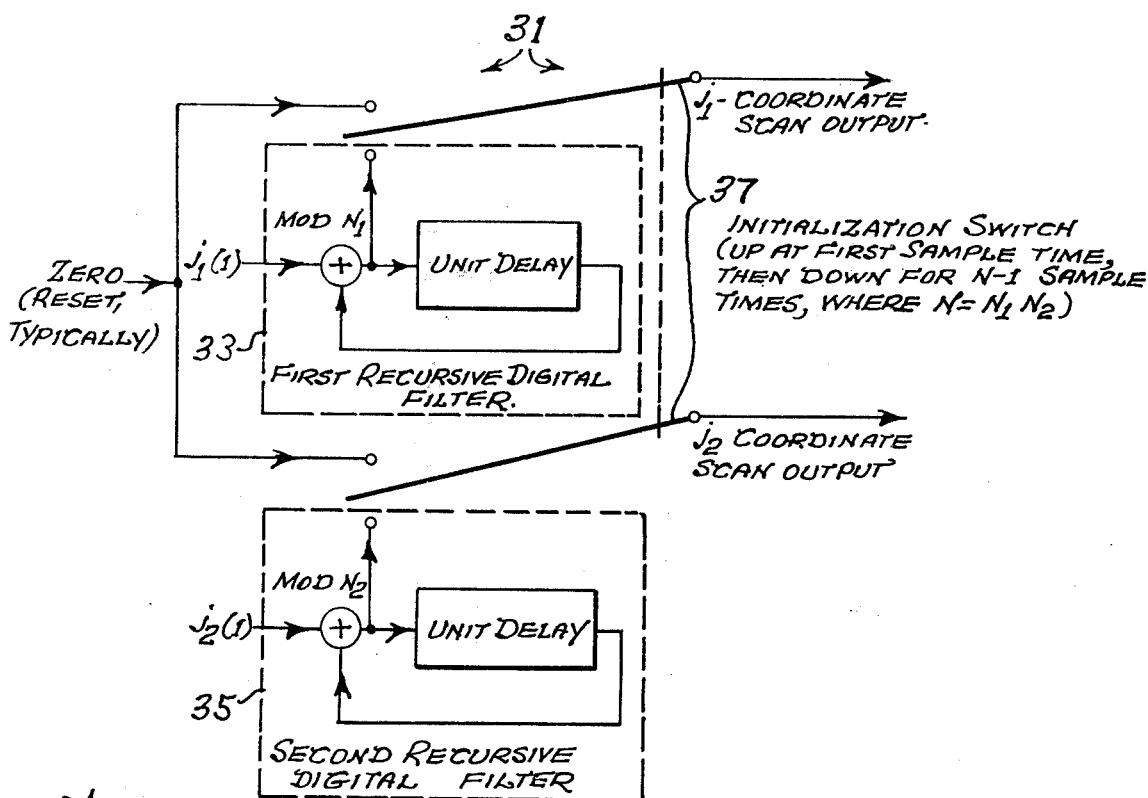
FIG. 2 is a block diagram of an input, or output, scan generator for use with the two-dimensional DFT apparatus of FIG. 1.
Figure 3:
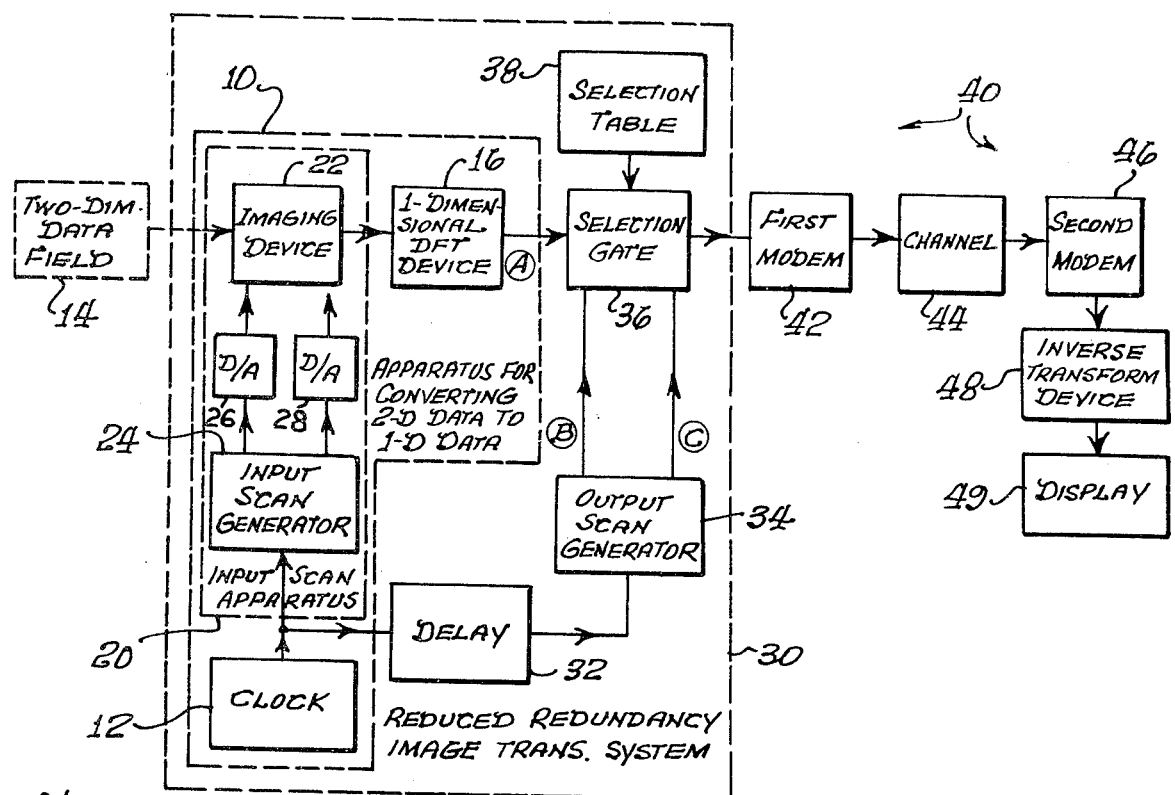
FIG. 3 is a block diagram showing (1) the two-dimensional DFT apparatus of FIG. 1; (2) a basic image transmission system for reduced redundancy of data points, using two-dimensional DFT apparatus; and (3) a complete image transmission system.

Omitting temporarily a description of FIG. 2, and referring to part of FIG. 3 first, it will be seen that the input scan apparatus 20 may further comprise an imaging device 22, for example a vidicon, which receives and stores the data from the two-dimensional data field 14. An input scan generator 24 scans in proper order the stored data in the imaging device, the stored data being scanned at discrete data points having coordinate values $j_1$ and $j_2$, the coordinate system generally being orthogonal.

In the apparatus 10 the input scan apparatus 20 may further comprise a pair of digital-to-analog (D/A) converters, 26 and 28, connected between the input scan generator 24 and the imaging device 22, to supply analog scanning voltages for scanning the imaging device.

D-to-A converters are required only if the imaging device requires analog control signals, like a vidicon. Also, some imaging devices, called charge injection device imagers, can accept digital control signals directly. The D-to-A converters are only needed or an imaging device which requires a pair of analog signals for vertical and horizontal control signals.

Referring now to FIG. 2, in the apparatus 10 of FIG. 3, the input scan apparatus 20 may comprise first recursive filter 33, the recursion relationship being $j_1(k+1)=j_1(k)+j_1(1)$, (Mod $N_1$), the output of the filter comprising the $j_1$-coordinate scan output. A second recursive filter 35, the recursion relationship being $j_2(k+1)=j_2(k)+j_2(1)$, (Mod $N_2$), has as its output the $j_2$-coordinate scan output.

A double-pole double-throw initialization switch 37 switches in a manner so that at one position of the switch, at a first sample time of the data field, the $j_1$ and $j_2$-coordinate scan outputs are zero, for example, by resetting a counter, but at the succeeding N-1 sample times the scan outputs are the outputs of the first and second recursive filters, 33 and 35, the two outputs comprising the input to the discrete Fourier transform device 16.

The apparatus 10 of FIG. 1 or FIG. 3 may further comprise the timing source, or clock 12, connected to the input scan apparatus 10. The left-hand part of FIG. 3, the part designated by the dashed line labeled 10, represents the most general form of taking a two-dimensional Fourier transform, using the one-dimensional discrete Fourier transform device 16. This is a basic part of the invention. Apparatus 10 can be used together with other devices shown in FIG. 3 to accomplish data compression.

Accordingly, in addition to the data conversion apparatus 10, the apparatus 30 of FIG. 3 may further comprise delay means 32 connected to the timing source 12. An output scan generator 34, whose input is connected to the output of the delay means 32, keeps track of the specific two-dimensional transform point which is currently being generated by the one-dimensional DFT device 16. The reason that the delay 32 is included in the apparatus 30 is that some time is required for the one-dimensional DFT device 16 to work. In order words, if it is a serial access transform device of the type referenced hereinabove, the data has to be fully into the delay line which forms part of DFT device 16 before the first transform output is obtained. Therefore, the output scan generator 34 as to start later than the input scan generator 24. It has to start as much later as is required to account for the D/A conversion by D/A converters 26 and 28, and for the propagation time through the one-dimensional Fourier transform device 16 to keep the apparatus 30 running synchronously.

A few theoretical remarks at this point should prove useful. The two-dimensional data field is scanned, and signals derived from the data points go through a one-dimensional discrete Fourier transform device 16. Now, the resulting one-dimensional output points correspond to the two-dimensional discrete Fourier transform of the data points. It is necessary to know what the twodimensional transform points correspond to with respect to the one-dimensional data stream, in other words, what the horizontal and the vertical frequencies are. This is the function of the output scan generator 34. It keeps count of the current horizontal frequency and vertical frequency.

The horizontal and vertical frequencies correspond to horizontal and vertical coordinates in the transform data space. The term "frequency" is used in this art for the transform variable index. The frequencies are just a labeling of coordinates in the transform plane.

As mentioned hereinabove, the image data points are characterized by various brightness levels, which are a function of the positions of the points. The transforms of the various points are characterized by frequencies.

To give a very simple example: assume that the optical image consists of several white horizontal bars in a black background. If a two-dimensional transform were taken of the image, in the horizontal direction only $d$-$c$ (zero frequency) outputs would be obtained, zero $d$-$c$ would be obtained for the black bars and some $d$-$c$ component for the white bars.

Transforming in the vertical direction, it would look like a transform of a repeating rectangular function, black for an interval, white for an interval, which decomposed looks like a sinusoid and harmonics of it, the period of the sinusoid being equal to the width of two bars.

What is obtained out of the DFT device 16 is a sequence of numbers, but it is necessary to know how to arrange the numbers, to be able to consider them as two-dimensional Fourier transform components. Therefore a pair of indices are required for each of the output numbers. The output scan generator 34 generates the pair of indices, and thereby determines the specific point currently coming out of the transform device 16.

The output scan generator 34 keep track of the specific two-dimensional transform because it "knows" what the output transform point is as a function of the clock time. That is the whole purpose of the scan generator 34. It controls the selection gate 36, described hereinbelow, but it requires no information from the selection gate. The output scan generator 34 is defined in FIG. 2 in terms of components which are well known in the computer arts.

The output scan generator 34 generates a pair of coordinates, whereas the input scan generator 24 produces a pair of coordinates which are used to control an imaging device 22, for example a vidicon. The output scan generator 34 keeps track of what two-dimensional transform point is currently being produced by the one-dimensional transform device 16.

For example, in conjunction with its use for image data compression, the output scan generator 34 is useful in that, for example, if the transformed vertical and horizontal coordinates are both large, which would indicate high frequencies in the transform domain, that data would be thrown away. If the transformed vertical coordinate is large and the transformed horizontal coordinate is small, or vice versa, it may or may not be desired to save the data, but at least, using the output scan generator 34, it can be determined what the vertical and horizontal frequencies are, and it can be decided whether or not to save that point or not. What is rejected are unneeded parts of the resolution and not parts of the optical image 14.

Referring back now to the system 30 shown in FIG. 3, a selection gate 36, controlled by the output scan generator 34, which has one input connected to the output of the DFT device 16 and another input connected to the output of the output scan generator, selects the specific frequencies, corresponding to specific coordinate values, which are to be transmitted. The selection gate 36 picks which frequencies go to the modem 42. "Modem" is a generic term for either modulator or demodulator, and will be referred to more fully hereinbelow.

A selection table 38, comprising a read-only memory (ROM), whose output is connected to the selection gate 36, stores information as to which frequencies are rejected. A selection table 38 is a read-only memory into which are set preferred selective quantization rules. High frequencies may be rejected or the selection table might be more elaborate, it might determine the use of eight bits of quantization for the zero frequency term and, say, six bits for the low vertical or low horizontal frequencies, whatever detailed quantization it is desired to use, it could all be stored in the selection table. Generally, the selection table 38 would store information as to which of the high frequencies are to be rejected, but it may also store information as to the required quantization for various frequencies of interest.

The selection gate 36 and selection table 38 are used so that only selected spatial Fourier transform coefficients will be transmitted through a channel. Usually, the Fourier transform coefficients which are chosen are those relating to lower frequency components, and usually they would be selectively quantized. This would depend upon how much data compression is desired. Selective data compression is old in the art.

Useful data compression where 90% of the information bits were eliminated has been accomplished, wherein some of the frequencies were not required, but also by providing more bits of quantization for the lower frequencies. Typically, only the lower 20% of the Fourier transform coefficients are saved.

The device 16 generates transforms corresponding to each point in the data field 14. The output scan generator 34 generates a pair of indices corresponding to the present transform frequency. These indices could be thought of as a two-dimensional number, having a horizontal coordinate and a vertical coordinate. The read-only memory 38 is addressed in the same two-dimensional format, for example, addressed by the output scan generator 34. For the simplest read-only memory 38 it could be just storing ones and zeroes. A one would be stored in each two-dimensional location corresponding to a frequency which could be used and a zero corresponding to a frequency not to be used. So the table 38 would in this instance just contain ones and zeroes in the appropriate locations.

As an example of the selection table storing digital data with respect to quantization levels, assume that the maximum number of bits of quantization are going to be four. Then, in each location in the look-up, or selection, table 38, an integer between 0 and 4 is stored or from zero to whatever the maximum number of bits is going to be. The gate 36 and table 38 is addressed in two-dimensional format by the output scan generator 34, and the number of bits to be used is simply read out.

The selection table can do both, it can store information as to which of the higher frequencies are to be rejected and it can provide required quantization for various frequencies of interest. The only difference in the table 38 between the multiple quantization case and the case where some frequencies are saved and others are rejected is simply the number of bits of information that need to be stored in each location of the table. If some frequencies are used and not others, with uniform quantization, then only one binary digit of information at each point in the table 38 need be stored. If quantization into K different levels is to be used, then storing is required in each location of the read-only memory 38.

The decision to use or not use specific frequencies is a special case of the multi-level quantization. Not using multilevel quantization corresponds to using zero bits for quantization. So that one selection table is all that is required, the only consideration is that a larger read-only memory, or table 38, is required to allow for selective quantization rather than for just selective elimination of samples, or frequencies.

Referring now to a more sophisticated embodiment of the image transmission system 40, which numeral includes the basic image transmission system 30, it further comprises a first modem 42, functioning as a modulator, whose input is connected to the output of the selection gate 36, the modem modulating the input signal. "Modem" refers to a device which does both modulation and demodulation. Here the first modem 42 is used as a modulator, the signal going into the channel 44 and as a demodulator coming out of the channel. A modulator 42 is used because the data has to be put in a compatible format going through the channel 44. For example, the channel 44 might be a radio channel.

The signal channel 44, whose input is connected to the output of the first modem 42, transmits the modulated signal. The channel might be a coaxial cable, through which it might be desired to send back an underwater image. A problem might be that the cable acts as a bandwidth-limited channel, and so one object of the invention would be to compress the data so that it can get through the cable. A case where radio link would be required is a remotely piloted vehicle actually being developed. The problem there is to provide protection against jamming, against something interfering with transmitted signals, and so what can be done is to spread the bandwidth occupied by the signal. The amount of protection against jamming depends upon how much the signal can be spread.

What this system 40 does is to remove as much as possible of the redundancy in the image, compressing the image data so that it can be spread by a larger factor if possible. A second modem 46, functioning as a demodulator, has its input connected to the output of the signal channel 44, for demodulating the modulated signal. An inverse transform device 48 has its input connected to the output of the second modem 46. A display device 49, whose input is connected to the output of the inverse transform device 48, displays the reduced redundancy image.

The theory behind the invention will now be discussed in detail. The two-dimensional discrete Fourier transform (DFT) system uses an input scanning apparatus 20 and a one-dimensional discrete Fourier transform device 16, as shown in FIG. 1. The two-dimensional transform block size, $N_1$ by $N_2$, corresponding to a data field having these dimensions, is chosen such that $N_1$ and $N_2$ are relatively prime integers (i.e., they must have no common divisor). As is shown in FIG. 1, $N_1$ may represent the number of data points in each row of the data block 14, while $N_2$ would represent the number of columns in the block, or vice versa. The one-dimensional Fourier transform device 16 has a block length of $N = N_1 N_2$.

The purpose of the input scanning apparatus 20 is to so order the input data from the two-dimensional data field 14 that the one-dimensional Fourier transform of the length $N_1 N_2$ serial data string is identical to an $N_1$ by $N_2$ two-dimensional Fourier transform of the $N_1$ by $N_2$ input data samples. If desired, an output scanning generator 34 may also be used to providee the transform output points in normal order.

The required scan may be derived from Preisendorfer's representation of a one-dimensional discrete Fourier transform matrix as a direct product matrix. This is described by Preisendorfer, R. W., in the unpublished manuscript entitled *Introduction to Fast Fourier Transforms*, put out by the Visibility Laboratory, University of California, San Diego, Spring 1967. A similar, published, treatment is entitled *Historical Notes on the Fast Fourier Transform*, by Cooley, J. W., Lewis, P. W., and Welch, P. D., IEEE Transactions on Audio and Electrical Acoustics, Vol. AU-15, pages 76–79, June 1967.

The following treatment is more detailed than either reference. Preisendorfer shows how the one-dimensional DFT in equation (1) is equivalent to the two-dimensional DFT in equation (2) when $N = N_1 N_2$ and $N_1, N_2$ are relatively prime.

$$\hat{f}_q = \sum_{p=0}^{N-1} f_p e^{-i2\pi \frac{pq}{N}} \quad (1)$$

for $p,q = 0,1,\ldots,N-1$ $$\hat{g}(k_1,k_2) = \sum_{j_1=0}^{N_1-1} \sum_{j_2=0}^{N_2-1} q(j_1,j_2) e^{-i2\pi \left(\frac{j_1 k_1}{N_1} + \frac{j_2 k_2}{N_2}\right)} \quad (2)$$

for $j_1, k_j = 0,1,\ldots,N_1-1$
$j_2, k_2 = 0,1,\ldots,N_2-1$

In order to make the two transforms equivalent, it is necessary to find a pair of one-to-one functions $P(j_1, j_2)$ and $Q(k_1, k_2)$ such that $$\frac{PQ}{N} = \frac{j_1 k_1}{N_1} + \frac{j_2 k_2}{N_2} \text{(Modulo 1)} \quad (3)$$

or $$PQ = j_1 k_1 N_2 + j_2 k_2 N_1 \text{ (Modulo } N_1 N_2\text{)} \quad (4)$$

This may be accomplished by letting $$P(j_1, j_2) = j_1 N_2 + j_2 N_1 \text{ (Modulo } N\text{)},$$
$$0 \leq j_1 \leq N_1-1, 0 \leq j_2 \leq N_2-1, \quad (5)$$

$$Q(k_1, k_2) = k_1 U_1 N_2 + k_2 U_2 N_1 \text{ (Modulo } N\text{)},$$
$$0 \leq k_1 \leq N_1-1, 0 \leq k_2 \leq N_2-1. \quad (6)$$

where the constants $U_1$ and $U_2$ are the solutions of $$N_2U_1 = 1 \text{ (Modulo } N_1\text{)} \tag{7}$$

$$N_1U_2 = 1 \text{ (Modulo } N_2\text{)} \tag{8}$$

Equations (7) and (8) will have solutions if and only if $N_1$ and $N_2$ are mutually prime. Under this condition, the mappings described by equations (5) and (6) will satisfy the requirement of equation (3).

Equations (5) through (8) define a one-to-one correspondence between one-dimensional points and two-dimensional points. Equations (5) and (6) show how to go from the two-dimensional coordinates of the input data to one-dimensional data.

Eq. (5) defines a one-to-one correspondence between coordinates having one-dimension and coordinates having two-dimensions. Since it is a one-to-one correspondence there is some two-dimensional point that gets mapped into the one-dimensional point, say 1. The two-dimensional point will have coordinates $j_1(1)$, $j_2(1)$. Now, since Eq. (5) is a linear equation, P is the image of $j_1$ and $j_2$.

Equation (5) may be interpreted as a prescription for building the input scan generator 24. As $j_1$ ranges from 0 to $N_1-1$ and $j_2$ ranges from 0 to $N_2-1$, P will take all values from 0 to $N_1N_2-1 = N-1$. These may be tabulated and rearranged in increasing order.

Since the data in the data field 14 is two-dimensional data, as in a TV image, it becomes necessary to scan the two-dimensional coordinates of the data points as a function of time, in order to determine the proper scanning sequence, inasmuch as the data points are not scanned sequentially, row by row or column by column. The scan equations (5) and (6) are required for the reverse transformation, in going from two dimensions to one. That is, as a function of time, it must be determined as to the sequence in which the points are examined. So that time corresponds to the one-dimensional coordinate, the two-dimensional coordinates corresponding to the position of the point in the picture.

To properly understand the scan of the picture, Eq. (5) must be inverted. The variable $j_1$ and $j_2$ must be solved as a function of P. i.e.

$$\begin{aligned}0 &= P(j_1(0), j_2(0)) \\ 1 &= P(j_1(1), j_2(1)) \\ &\vdots \\ N-1 &= P(j_1(N-1), j_2(N-1))\end{aligned} \tag{9}$$

In Eq. (9), $j_1$ and $j_2$ are mapped into single points, on the left side of the equation.

The object of the mathematical manipulations is to strike a correspondence between a one-dimensional series of numbers of length $N = N_1N_2$ and a two-dimensional array having dimensions $N_1$ by $N_2$. In Eq.(5) the one-dimensional coordinate is viewed in terms of two-dimensional coordinates.

In Eq.(9), the point of view is changed, in that $j_1$ and $j_2$ are viewed as functions of P, as functions of a one-dimensional coordinate. So that in Eq.(9), a one-dimensional point s is taken and mapped into two-dimensions, $j_1(s)$ and $j_2(s)$. It is then mapped back by taking the P function of $j_1(s)$ and $j_2(s)$, which will have to equal s again. In general terms, $$s = P(j_1(s), j_2(s)). \tag{9a}$$

The values $j_1(0), \ldots, j_1(N-1)$ from Eq.(9) may be stored in a pair of read-only memories (ROMs) to provide the input scan generator.

To eliminate the ROM's it is to be noted that $$P(j_1(1) + j_1(s), j_2(1) + j_2(s)) = P(j_1(s), j_2(s)) + P(j_1(1), j_2(1)) \text{ (Mod } N_1N_2\text{)} \tag{10}$$

Therefore $$j_1(s+1) = j_1(s) + j_1(1) \text{ (Mod } N_1\text{)} \tag{11}$$

$$j_2(s+1) = j_2(s) + j_2(1) \text{ (Mod } N_2\text{)} \tag{12}$$

Eq. (10) makes use of the fact that Eq.(5) is linear. If $j_1$ and $j_2$ are regarded as forming a vector, Eq.(5) states that the image of the vector is a linear function of the vector, and so the image of the sum of the two vectors is the sum of the two images, reduced modulo N. Eq.(10) states this relationship. Thus only simple recursive digital filters, 33 and 35, are needed for the input scan generator 31, shown in FIG. 2. With only a change in the prestored constants, replacing $j_1(1)$ by $k_1(1)$ and $j_2(1)$ by $k_2(1)$, the circuit of FIG. 2 will also function as the output scan generator. Representative input and output scans are shown in TABLES 1 and 2.

TABLE 1:

Representative Input Scans

| | | $N_1 = 3$ | $N_2 = 4$ | $N = 12$ |
|---|---|---|---|---|
| 1.1 | | $j_1 = 0$ | $j_1 = 1$ | $j_1 = 2$ |
| | $j_2 = 0$ | 0 | 4 | 8 |
| | $j_2 = 1$ | 3 | 7 | 11 |
| | $j_2 = 2$ | 6 | 10 | 2 |
| | $j_2 = 3$ | 9 | 1 | 5 |
| 1.2 | | $N_1 = 3$ | $N_2 = 5$ | $N = 15$ |
| | | 0 | 5 | 10 |
| | | 3 | 8 | 13 |
| | | 6 | 11 | 1 |
| | | 9 | 14 | 4 |
| | | 12 | 2 | 7 |
| 1.3 | | $N_1 = 3$ | $N_2 = 7$ | $N = 21$ |
| | | 0 | 7 | 14 |
| | | 3 | 10 | 17 |
| | | 6 | 13 | 20 |
| | | 9 | 16 | 2 |
| | | 12 | 19 | 5 |
| | | 15 | 1 | 8 |
| | | 18 | 4 | 11 |
| 1.4 | | $N_1 = 3$ | $N_2 = 8$ | $N = 24$ |
| | | 0 | 8 | 16 |
| | | 3 | 11 | 19 |
| | | 6 | 14 | 22 |
| | | 9 | 17 | 1 |
| | | 12 | 20 | 4 |
| | | 15 | 23 | 7 |
| | | 18 | 2 | 10 |
| | | 21 | 5 | 13 |
| 1.5 | | $N_1 = 3$ | $N_2 = 10$ | $N = 30$ |
| | | 0 | 10 | 20 |
| | | 3 | 13 | 23 |
| | | 6 | 16 | 26 |
| | | 9 | 19 | 29 |
| | | 12 | 22 | 2 |
| | | 15 | 25 | 5 |
| | | 18 | 28 | 8 |
| | | 21 | 1 | 11 |
| | | 24 | 4 | 14 |
| | | 27 | 7 | 17 |
| 1.6 | | $N_1 = 4$ | $N_2 = 5$ | $N = 20$ |
| | | 0 | 5 | 10 | 15 |
| | | 4 | 9 | 14 | 19 |
| | | 8 | 13 | 18 | 3 |
| | | 12 | 17 | 2 | 7 |
| | | 16 | 1 | 6 | 11 |
| 1.7 | | $N_1 = 4$ | $N_2 = 7$ | $N = 28$ |
| | | 0 | 7 | 14 | 21 |
| | | 4 | 11 | 18 | 25 |

TABLE 1:-continued

Representative Input Scans

|     |          |     |     |     |     |     |     |
|-----|----------|-----|-----|-----|-----|-----|-----|
|     |          | 8   | 15  | 22  | 1   |     |     |
|     |          | 12  | 19  | 26  | 5   |     |     |
|     |          | 16  | 23  | 2   | 9   |     |     |
|     |          | 20  | 27  | 6   | 13  |     |     |
|     |          | 24  | 3   | 10  | 17  |     |     |

1.8  $N_1 = 4$   $N_2 = 9$   $N = 36$

| 0 | 9 | 18 | 27 |
|---|---|----|----|
| 4 | 13 | 22 | 31 |
| 8 | 17 | 26 | 35 |
| 12 | 21 | 30 | 3 |
| 16 | 25 | 34 | 7 |
| 20 | 29 | 2 | 11 |
| 24 | 33 | 6 | 15 |
| 28 | 1 | 10 | 19 |
| 32 | 5 | 14 | 23 |

1.9  $N_1 = 5$   $N_2 = 6$   $N = 30$

| 0 | 6 | 12 | 18 | 24 |
|---|---|----|----|----|
| 5 | 11 | 17 | 23 | 29 |
| 10 | 16 | 22 | 28 | 4 |
| 15 | 21 | 27 | 3 | 9 |
| 20 | 26 | 2 | 8 | 14 |
| 25 | 1 | 7 | 13 | 19 |

1.10  $N_1 = 5$   $N_2 = 7$   $N = 35$

| 0 | 7 | 14 | 21 | 28 |
|---|---|----|----|----|
| 5 | 12 | 19 | 26 | 33 |
| 10 | 17 | 24 | 31 | 3 |
| 15 | 22 | 29 | 1 | 8 |
| 20 | 27 | 34 | 6 | 13 |
| 25 | 32 | 4 | 11 | 18 |
| 30 | 2 | 9 | 16 | 23 |

1.11  $N_1 = 5$   $N_2 = 8$   $N = 40$

| 0 | 8 | 16 | 24 | 32 |
|---|---|----|----|----|
| 5 | 13 | 21 | 29 | 37 |
| 10 | 18 | 26 | 34 | 2 |
| 15 | 23 | 31 | 39 | 7 |
| 20 | 28 | 36 | 4 | 12 |
| 25 | 33 | 1 | 9 | 17 |
| 30 | 38 | 6 | 14 | 22 |
| 35 | 3 | 11 | 19 | 27 |

1.12  $N_1 = 5$   $N_2 = 9$   $N = 45$

| 0 | 9 | 18 | 27 | 36 |
|---|---|----|----|----|
| 5 | 14 | 23 | 32 | 41 |
| 10 | 19 | 28 | 37 | 1 |
| 15 | 24 | 33 | 42 | 6 |
| 20 | 29 | 38 | 2 | 11 |
| 25 | 34 | 43 | 7 | 16 |
| 30 | 39 | 3 | 12 | 21 |
| 35 | 44 | 8 | 17 | 26 |
| 40 | 4 | 13 | 22 | 31 |

1.13  $N_1 = 6$   $N_2 = 7$   $N = 42$

| 0 | 7 | 14 | 21 | 28 | 35 |
|---|---|----|----|----|----|
| 6 | 13 | 20 | 27 | 34 | 41 |
| 12 | 19 | 26 | 33 | 40 | 5 |
| 18 | 25 | 32 | 39 | 4 | 11 |
| 24 | 31 | 38 | 3 | 10 | 17 |
| 30 | 37 | 2 | 9 | 16 | 23 |
| 36 | 1 | 8 | 15 | 22 | 29 |

1.14  $N_1 = 7$   $N_2 = 8$   $N = 56$

| 0 | 8 | 16 | 24 | 32 | 40 | 48 |
|---|---|----|----|----|----|----|
| 7 | 15 | 23 | 31 | 39 | 47 | 55 |
| 14 | 22 | 30 | 38 | 46 | 54 | 6 |
| 21 | 29 | 37 | 45 | 53 | 5 | 13 |
| 28 | 36 | 44 | 52 | 4 | 12 | 20 |
| 35 | 43 | 51 | 3 | 11 | 19 | 27 |
| 42 | 50 | 2 | 10 | 18 | 26 | 34 |
| 49 | 1 | 9 | 17 | 25 | 33 | 41 |

1.15  $N_1 = 7$   $N_2 = 9$   $N = 63$

| 0 | 9 | 18 | 27 | 36 | 45 | 54 |
|---|---|----|----|----|----|----|
| 7 | 16 | 25 | 34 | 43 | 52 | 61 |
| 14 | 23 | 32 | 41 | 50 | 59 | 5 |
| 21 | 30 | 39 | 48 | 57 | 3 | 12 |
| 28 | 37 | 46 | 55 | 1 | 10 | 19 |
| 35 | 44 | 53 | 62 | 8 | 17 | 26 |
| 42 | 51 | 60 | 6 | 15 | 24 | 33 |
| 49 | 58 | 4 | 13 | 22 | 31 | 40 |
| 56 | 2 | 11 | 20 | 29 | 38 | 47 |

1.16  $N_1 = 7$   $N_2 = 10$   $N = 70$

| 0 | 10 | 20 | 30 | 40 | 50 | 60 |
|---|----|----|----|----|----|----|
| 7 | 17 | 27 | 37 | 47 | 57 | 67 |
| 14 | 24 | 34 | 44 | 54 | 64 | 4 |
| 21 | 31 | 41 | 51 | 61 | 1 | 11 |
| 28 | 38 | 48 | 58 | 68 | 8 | 18 |

1.17  $N_1 = 8$   $N_2 = 9$   $N = 72$

| 0 | 9 | 18 | 27 | 36 | 45 | 54 | 63 |
|---|---|----|----|----|----|----|----|
| 8 | 17 | 26 | 35 | 44 | 53 | 62 | 71 |
| 16 | 25 | 34 | 43 | 52 | 61 | 70 | 7 |
| 24 | 33 | 42 | 51 | 60 | 69 | 6 | 15 |
| 32 | 41 | 50 | 59 | 68 | 5 | 14 | 23 |
| 40 | 49 | 58 | 67 | 4 | 13 | 22 | 31 |
| 48 | 57 | 66 | 3 | 12 | 21 | 30 | 39 |
| 56 | 65 | 2 | 11 | 20 | 29 | 38 | 47 |
| 64 | 1 | 10 | 19 | 28 | 37 | 46 | 55 |

1.18  $N_1 = 9$   $N_2 = 10$   $N = 90$

| 0 | 10 | 20 | 30 | 40 | 50 | 60 | 70 | 80 |
|---|----|----|----|----|----|----|----|----|
| 9 | 19 | 29 | 39 | 49 | 59 | 69 | 79 | 89 |
| 18 | 28 | 38 | 48 | 58 | 68 | 78 | 88 | 8 |
| 27 | 37 | 47 | 57 | 67 | 77 | 87 | 7 | 17 |
| 36 | 46 | 56 | 66 | 76 | 86 | 6 | 16 | 26 |
| 45 | 55 | 65 | 75 | 85 | 5 | 15 | 25 | 35 |
| 54 | 64 | 74 | 84 | 4 | 14 | 24 | 34 | 44 |
| 63 | 73 | 83 | 3 | 13 | 23 | 33 | 43 | 53 |
| 72 | 82 | 2 | 12 | 22 | 32 | 42 | 52 | 62 |
| 81 | 1 | 11 | 21 | 31 | 41 | 51 | 61 | 71 |

TABLE 2:

Representative Output Scans 2.1  $N = 12$   $N_1 = 3$   $N_2 = 4$   $U_1 = 1$   $U_2 = 3$

| 0 | 4 | 8 |
|---|---|---|
| 9 | 1 | 5 |
| 6 | 10 | 2 |
| 3 | 7 | 11 |

2.2  $N = 15$   $N_1 = 3$   $N_2 = 5$   $U_1 = 2$   $U_2 = 2$

| 0 | 10 | 5 |
|---|----|---|
| 6 | 1 | 11 |
| 12 | 7 | 2 |
| 3 | 13 | 8 |
| 9 | 4 | 14 |

2.3  $N = 21$   $N_1 = 3$   $N_2 = 7$   $U_1 = 1$   $U_2 = 5$

| 0 | 7 | 14 |
|---|---|----|
| 15 | 1 | 8 |
| 9 | 16 | 2 |
| 3 | 10 | 17 |
| 18 | 4 | 11 |
| 12 | 19 | 5 |
| 6 | 13 | 20 |

2.4  $N = 24$   $N_1 = 3$   $N_2 = 8$   $U_1 = 2$   $U_2 = 3$

| 0 | 16 | 8 |
|---|----|---|
| 9 | 1 | 17 |
| 18 | 10 | 2 |
| 3 | 19 | 11 |
| 12 | 4 | 20 |
| 21 | 13 | 5 |
| 6 | 22 | 14 |
| 15 | 7 | 23 |

2.5  $N = 30$   $N_1 = 3$   $N_2 = 10$   $U_1 = 1$   $U_2 = 7$

| 0 | 10 | 20 |
|---|----|----|
| 21 | 1 | 11 |
| 12 | 22 | 2 |
| 3 | 13 | 23 |
| 24 | 4 | 14 |
| 15 | 25 | 5 |
| 6 | 16 | 26 |
| 27 | 7 | 17 |
| 18 | 28 | 8 |
| 9 | 19 | 29 |

2.6  $N = 20$   $N_1 = 4$   $N_2 = 5$   $U_1 = 1$   $U_2 = 4$

| 0 | 5 | 10 | 15 |
|---|---|----|----|
| 16 | 1 | 6 | 11 |
| 12 | 17 | 2 | 7 |
| 8 | 13 | 18 | 3 |
| 4 | 9 | 14 | 19 |

2.7  $N = 28$   $N_1 = 4$   $N_2 = 7$   $U_1 = 3$   $U_2 = 2$

| 0 | 21 | 14 | 7 |
|---|----|----|---|
| 8 | 1 | 22 | 15 |
| 16 | 9 | 2 | 23 |
| 24 | 17 | 10 | 3 |

TABLE 2:-continued

Representative Output Scans

|   |   |   |   |   |   |   |   |
|---|---|---|---|---|---|---|---|
|   | 4 | 25 |   |   | 18 | 11 |   |
|   | 12 | 5 |   |   | 26 | 19 |   |
|   | 20 | 13 |   |   | 6 | 27 |   |
| 2.8 | N = 36 | N₁ = 4 | N₂ = 9 |   | U₁ = 1 | U₂ = 7 |   |
|   | 0 | 9 |   |   | 18 | 27 |   |
|   | 28 | 1 |   |   | 10 | 19 |   |
|   | 20 | 29 |   |   | 2 | 11 |   |
|   | 12 | 21 |   |   | 30 | 3 |   |
|   | 4 | 13 |   |   | 22 | 31 |   |
|   | 32 | 5 |   |   | 14 | 23 |   |
|   | 24 | 33 |   |   | 6 | 15 |   |
|   | 16 | 25 |   |   | 34 | 7 |   |
|   | 8 | 17 |   |   | 26 | 35 |   |
| 2.9 | N = 30 | N₁ = 5 | N₂ = 6 |   | U₁ = 1 | U₂ = 5 |   |
|   | 0 | 6 | 12 |   | 18 | 24 |   |
|   | 25 | 1 | 7 |   | 13 | 19 |   |
|   | 20 | 26 | 2 |   | 8 | 14 |   |
|   | 15 | 21 | 27 |   | 3 | 9 |   |
|   | 10 | 16 | 22 |   | 28 | 4 |   |
|   | 5 | 11 | 17 |   | 23 | 29 |   |
| 2.10 | N = 35 | N₁ = 5 | N₂ = 7 |   | U₁ = 3 | U₂ = 3 |   |
|   | 0 | 21 | 7 |   | 28 | 14 |   |
|   | 15 | 1 | 22 |   | 8 | 29 |   |
|   | 30 | 16 | 2 |   | 23 | 9 |   |
|   | 10 | 31 | 17 |   | 3 | 24 |   |
|   | 25 | 11 | 32 |   | 18 | 4 |   |
|   | 5 | 26 | 12 |   | 33 | 19 |   |
|   | 20 | 6 | 27 |   | 13 | 34 |   |
| 2.11 | N = 40 | N₁ = 5 | N₂ = 8 |   | U₁ = 2 | U₂ = 5 |   |
|   | 0 | 16 | 32 |   | 8 | 24 |   |
|   | 25 | 1 | 17 |   | 33 | 9 |   |
|   | 10 | 26 | 2 |   | 18 | 34 |   |
|   | 35 | 11 | 27 |   | 3 | 19 |   |
|   | 20 | 36 | 12 |   | 28 | 4 |   |
|   | 5 | 21 | 37 |   | 13 | 29 |   |
|   | 30 | 6 | 22 |   | 38 | 14 |   |
|   | 15 | 31 | 7 |   | 23 | 39 |   |
| 2.12 | N = 45 | N₁ = 5 | N₂ = 9 |   | U₁ = 4 | U₂ = 2 |   |
|   | 0 | 36 | 27 |   | 18 | 9 |   |
|   | 10 | 1 | 37 |   | 28 | 19 |   |
|   | 20 | 11 | 2 |   | 38 | 29 |   |
|   | 30 | 21 | 12 |   | 3 | 39 |   |
|   | 40 | 31 | 22 |   | 13 | 4 |   |
|   | 5 | 41 | 32 |   | 23 | 14 |   |
|   | 15 | 6 | 42 |   | 33 | 24 |   |
|   | 25 | 16 | 7 |   | 43 | 34 |   |
|   | 35 | 26 | 17 |   | 8 | 44 |   |
| 2.13 | N = 42 | N₁ = 6 |   | N₂ = 7 | U₁ = 1 | U₂ = 6 |   |
|   | 0 | 7 | 14 | 21 | 28 | 35 |   |
|   | 36 | 1 | 8 | 15 | 22 | 29 |   |
|   | 30 | 37 | 2 | 9 | 16 | 23 |   |
|   | 24 | 31 | 38 | 3 | 10 | 17 |   |
|   | 18 | 25 | 32 | 39 | 4 | 11 |   |
|   | 12 | 19 | 26 | 33 | 40 | 5 |   |
|   | 6 | 13 | 20 | 27 | 34 | 41 |   |
| 2.14 | N = 56 | N₁ = 7 | N₂ = 8 |   | U₁ = 1 | U₂ = 7 |   |
|   | 0 | 8 | 16 | 24 | 32 | 40 | 48 |
|   | 49 | 1 | 9 | 17 | 25 | 33 | 41 |
|   | 42 | 50 | 2 | 10 | 18 | 26 | 34 |
|   | 35 | 43 | 51 | 3 | 11 | 19 | 27 |
|   | 28 | 36 | 44 | 52 | 4 | 12 | 20 |
|   | 21 | 29 | 37 | 45 | 53 | 5 | 13 |
|   | 14 | 22 | 30 | 38 | 46 | 54 | 6 |
|   | 7 | 15 | 23 | 31 | 39 | 47 | 55 |
| 2.15 | N = 63 | N₁ = 7 | N₂ = 9 |   | U₁ = 4 | U₂ = 4 |   |
|   | 0 | 36 | 9 | 45 | 18 | 54 | 27 |
|   | 28 | 1 | 37 | 10 | 46 | 19 | 55 |
|   | 56 | 29 | 2 | 38 | 11 | 47 | 20 |
|   | 21 | 57 | 30 | 3 | 39 | 12 | 48 |
|   | 49 | 22 | 58 | 31 | 4 | 40 | 13 |
|   | 14 | 50 | 23 | 59 | 32 | 5 | 41 |
|   | 42 | 15 | 51 | 24 | 60 | 33 | 6 |
|   | 7 | 43 | 16 | 52 | 25 | 61 | 34 |
|   | 35 | 8 | 44 | 17 | 53 | 26 | 62 |
| 2.16 | N = 70 | N₁ = 7 | N₂ = 10 |   | U₁ = 5 | U₂ = 3 |   |
|   | 0 | 50 | 30 | 10 | 60 | 40 | 20 |
|   | 21 | 1 | 51 | 31 | 11 | 61 | 41 |
|   | 42 | 22 | 2 | 52 | 32 | 12 | 62 |
|   | 63 | 43 | 23 | 3 | 53 | 33 | 13 |
|   | 14 | 64 | 44 | 24 | 4 | 54 | 34 |
|   | 35 | 15 | 65 | 45 | 25 | 5 | 55 |
|   | 56 | 36 | 16 | 66 | 46 | 26 | 6 |
|   | 7 | 57 | 37 | 17 | 67 | 47 | 27 |
|   | 28 | 8 | 58 | 38 | 18 | 68 | 48 |
|   | 49 | 29 | 9 | 59 | 39 | 19 | 69 |
| 2.17 | N = 72 | N₁ = 8 | N₂ = 9 |   | U₁ = 1 | U₂ = 8 |   |
|   | 0 | 9 | 18 | 27 | 36 | 45 | 54 | 63 |
|   | 64 | 1 | 10 | 19 | 28 | 37 | 46 | 55 |
|   | 56 | 65 | 2 | 11 | 20 | 29 | 38 | 47 |
|   | 48 | 57 | 66 | 3 | 12 | 21 | 30 | 39 |
|   | 40 | 49 | 58 | 67 | 4 | 13 | 22 | 31 |
|   | 32 | 41 | 50 | 59 | 68 | 5 | 14 | 23 |
|   | 24 | 33 | 42 | 51 | 60 | 69 | 6 | 15 |
|   | 16 | 25 | 34 | 43 | 52 | 61 | 70 | 7 |
|   | 8 | 17 | 26 | 35 | 44 | 53 | 62 | 71 |
| 2.18 | N = 90 | N₁ = 9 | N₂ = 10 |   | U₁ = 1 | U₂ = 9 |   |
|   | 0 | 10 | 20 | 30 | 40 | 50 | 60 | 70 | 80 |
|   | 81 | 1 | 11 | 21 | 31 | 41 | 51 | 61 | 71 |
|   | 72 | 82 | 2 | 12 | 22 | 32 | 42 | 52 | 62 |
|   | 63 | 73 | 83 | 3 | 13 | 23 | 33 | 43 | 53 |
|   | 54 | 64 | 74 | 84 | 4 | 14 | 24 | 34 | 44 |
|   | 45 | 55 | 65 | 75 | 85 | 5 | 15 | 25 | 35 |
|   | 36 | 46 | 56 | 66 | 76 | 86 | 6 | 16 | 26 |
|   | 27 | 37 | 47 | 57 | 67 | 77 | 87 | 7 | 17 |
|   | 18 | 28 | 38 | 48 | 58 | 68 | 78 | 88 | 8 |
|   | 9 | 19 | 29 | 39 | 49 | 59 | 69 | 79 | 89 |

In addition to eliminating the intermediate transform memory, it is also possible to eliminate the ROM's used in the CZT implementations of the one-dimensional DFT, $(e^{-i2\pi})/N$ Let $$W = e \quad (13)$$

Figure 4:
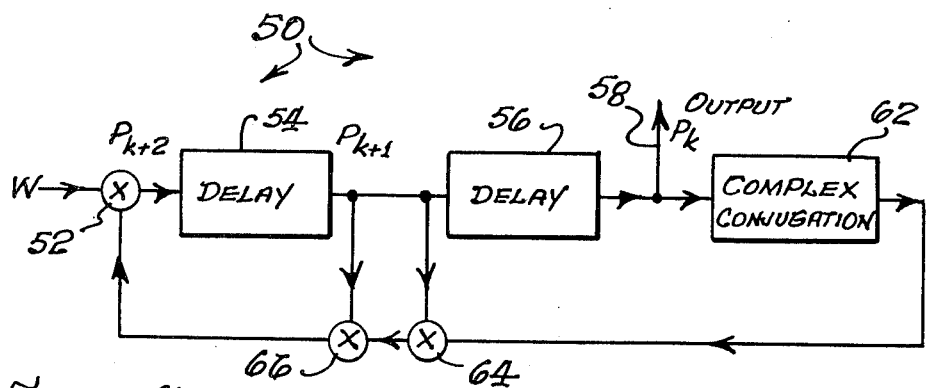
FIG. 4 is a block diagram of a recursive filter for discrete chirp generation.

Then the discrete chirps needed by the CZT, $p_k = W^{k^2/2}$, satisfy the recursion relation $$p_{k+2} = W\, p^2_{k+1}/p_k \quad (14)$$

or $$p_{k+2} = W\, p^2_{k+1}\, p_k^* , \quad (15)$$

where the star (*) indicates the complex conjugate. Equations (14) and (15) designate points of a discrete chirp. This may be implemented by the recursive digital filter 50 shown in FIG. 4, in which only the single constant W need be stored.

As contrasted with previous digital two-dimensional Fourier transform devices, the device described here can be extremely fast since a large number of multipliers are effectively utilized in the correlator or convolver of the one-dimensional DFT 16 it uses. As contrasted with previous optical two-dimensional Fourier transform devices, the device described here interfaces extremely well with electronic signal processing systems, and lends itself to potential mass production via integrated circuit fabrication techniques, representing a potential very large savings in cost for quantity production.

The one-dimensional DFT 16 which is utilized may be implemented using acoustic surface waves, charge couple devices, digital LSI correlators, or other serial-access transversal filters or correlators.

Transforms of higher dimensionality may be implemented by adding additional sections to the scan generator 24. The only fundamental constraint is that the size, N, of the one-dimensional DFT 16 device of FIG. 3 must be the product of the individual dimension sizes $N_1, \ldots, N_p$, and every pair $N_R, N_S$ must be mutually prime.

Obviously may modifications and variations of the present invention are possible in the light of the above teachings. It is therefore to be understood that within the scope of the appended claims the invention may be practiced otherwise than as specifically described.

What is claimed is:

1. An apparatus for the generation of two-dimensional discrete Fourier transforms of an input signal developed from a data field having a size of $N_1$ by $N_2$, $N_1$ and $N_2$ being relatively prime with respect to each other, comprising:

an input scan apparatus for scanning the $N_1$ by $N_2$ two-dimensional data field comprising the input signal, which receives and scans in such an order, or sequence, the $N_1$ by $N_2$ input data samples in the field so that a subsequently generated one-dimensional Fourier transform of a length $N_1 N_2$ serial data string is identical to an $N_1$ by $N_2$ two-dimensional discrete Fourier transform of the $N_1$ by $N_2$ input data samples; and a serial-access one-dimensional discrete Fourier transform (DFT) device, connected to the input scan generator, for generating a one-dimensional discrete Fourier transform of the length $N_1 N_2$ serial data string.

2. The apparatus according to claim 1, wherein:
the input scan apparatus scans selectively according to any one of the sequences shown in Table 1.

3. The apparatus according to claim 1, wherein the input scan apparatus comprises:

an imaging device which receives and stores the data from the two-dimensional data field; and an input scan generator which scans the stored data in the imaging device, the stored data being scanned at discrete data points having coordinate values $j_1$ and $j_2$, $j_1$ and $j_2$ forming a coordinate system.

4. The apparatus according to claim 3, wherein the input scan generator scans the stored data at discrete data points $j_1$ and $j_2$, the system of coordinates $j_1$ and $j_2$ comprising an orthogonal coordinate system.

5. The apparatus according to claim 3, wherein the input scan apparatus further comprises:

a pair of digital-to-analog (D/A) converters connected between the input scan generator and the imaging device, to supply analog scanning voltages for scanning the imaging device.

6. The apparatus according to claim 5, wherein the imaging device is a vidicon.

7. The apparatus according to claim 1, wherein the input scan apparatus includes an input scan generator which comprises:

a first recursive filter; the recursion relationship being $j_1(k+1) = j_1(k) + j_1(1)$, (Mod $N_1$), $k=0, \ldots, N_1 N_2$, the output of the filter comprising a $j_1$-coordinate scan output;

a second recursive filter, the recursion relationship being $j_2(k+1) = j_2(k) + j_2(1)$, (Mod $N_2$), the output of this filter comprising a $j_2$-coordinate scan output, $j_1$ and $j_2$ forming a coordinate system; and a double-pole double-throw initialization switch, which switches in a manner so that at one position of the switch, at a first sample time of the data field, the $j_1$- and $j_2$-coordinate scan outputs are zero, but at the succeeding N-1 sample times the scan outputs are the outputs of the modulo $N_1$ and modulo $N_2$ recursive filters, the two outputs comprising the input to the discrete Fourier transform device.

8. The apparatus according to claim 7, further comprising:

a timing source, connected to the input scan generator.

9. The apparatus according to claim 8, further comprising:

means connected to the timing source for delaying the signals from the timing source;

an output scan generator whose input is connected to the output of the delay means, which keep track of the specific two-dimensional transform point which is currently being produced by the one-dimensional transform device;

a selection gate, which has one input connected to the output of the DFT device and another input connected to the output of the output scan generator, the gate selecting the specific frequencies, corresponding to specific coordinate values, which are to be transmitted; and a read-only memory (ROM), serving as a selection table, whose output is connected to the selection gate, which stores information as to which frequencies are rejected.

10. The apparatus according to claim 9, wherein the read-only memory stores information as to which higher frequencies of the selected specific frequencies are rejected.

11. The apparatus according to claim 9, wherein the selection table also stores information as to required quantization for various frequencies of interest.

12. The image transmission system according to claim 11 further comprising:

a first modem, functioning as a modulator, whose input is connected to the output of the selection gate, which modulates the input signal;

a signal channel, whose input is connected to the output of the first modem, for transmitting the modulated signal;

a second modem, functioning as a demodulator, whose input is connected to the output of the signal channel, for demodulating the modulated signal;

an inverse transform device whose input is connected to the output of the second modem; and a display device, whose input is connected to the output of the inverse transform device, which displays the reduced redundancy image.

* * * * *